March 20, 1962 S. LIGHTER 3,026,399
FOOD HEATER
Filed Nov. 6, 1958 2 Sheets-Sheet 1

INVENTOR.
STEPHEN LIGHTER
BY
Attorney

March 20, 1962 S. LIGHTER 3,026,399
FOOD HEATER
Filed Nov. 6, 1958 2 Sheets-Sheet 2
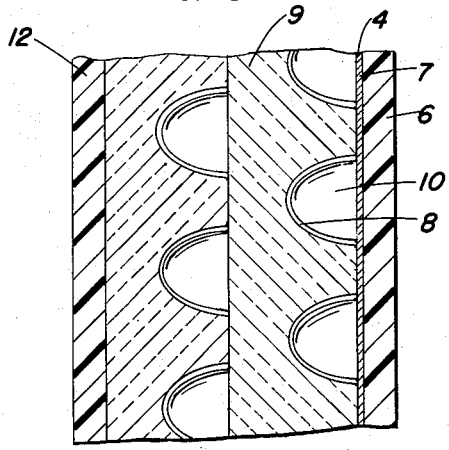
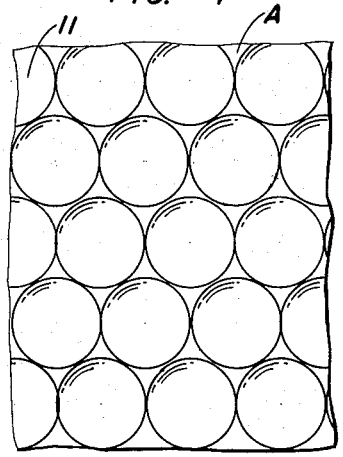
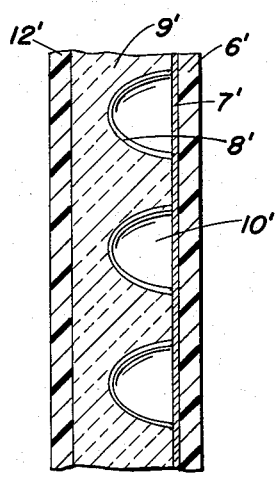
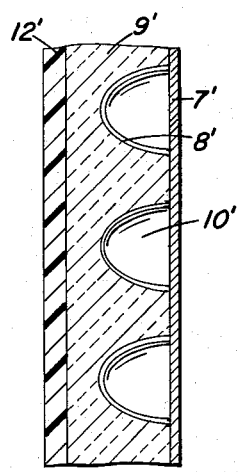
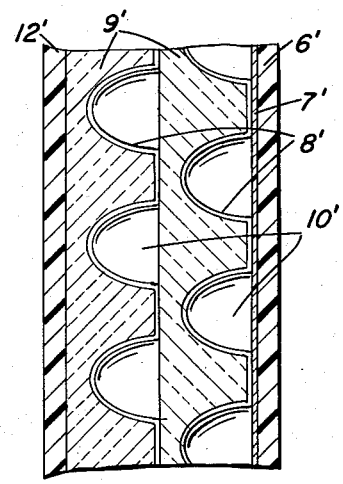
INVENTOR.
STEPHEN LIGHTER
BY
Attorney : # 3,026,399
FOOD HEATER
Stephen Lighter, 3522 Lake Mendota Drive,
Madison, Wis.
Filed Nov. 6, 1958, Ser. No. 772,293
5 Claims. (Cl. 219—35)

This invention relates to a heating and heat-retaining device for food and in particular to a food heater for use in aircraft and other related fields.

Anyone who has traveled extensively by air, on either commercial flights or private planes, is familiar with the problem of keeping food hot for extended periods. An airline that could offer hot foods and beverages at the end of a 10 or 15 hour flight, without the necessity of having one of the stewardesses take her attention from the passengers to prepare it, would have a decided competitive advantage. A food heater such as is herein described would also find a ready market among all day ocean fishermen, private plane operators, yacht sailors, long-haul express bus companies and many similar fields where there is a demand for hot food without the space and equipment needed to produce it. At present one operating a business of this nature must serve lukewarm food, no food, or install heavy and expensive food preparation equipment and personnel.

It is the purpose of this invention to provide a food-heater of reasonable size, weight, and economy to be used where there is a demand for hot food and a need for economy in weight and space.

Other purposes will become apparent from the drawings and from the following detailed description in which it is intended to illustrate the applicability of the invention without thereby limiting it to a scope less than that of all equivalents which will be apparent to one skilled in the art.

This invention is a unique improvement upon my earlier invention entitled "Method of Making Building Insulation and Product," Patent No. 2,747,651, filed on December 1, 1954, in which I disclosed the use of small, substantially spherical concavities located throughout the surface of an insulating panel and provided with heat reflecting surfaces to materially decrease the flow of heat through said insulating panel. By including a unique additional member, a layer of heat-producing material disposed adjacent to said concavities, a heating panel may be constructed as is herein disclosed.

A preferred embodiment of the invention consists of a protective surfacing layer, backed by a layer of some material of moderate to high electrical resistivity, backed by one or more sheets of relatively thick, inexpensive insulating material which has the surface facing the electrical conductor indented with a plurality of local concavities, each having a substantially parabolic zone surface and completely covered with a thin, reflective, electrically non-conductive coating. When an electric current is passed through the layer of moderate to high electrical resistivity heat is produced. This heat is contained by the insulating sheets and directed back towards the surface of the paneling by the highly reflective surface coating and focused on the heating layer by the geometrical shape of the substantially parabolic concavities. The paneling may be used throughout the area to be heated and may be connected to an electrical source through a transformer, or through a rectifier, or through both; or directly to a source of low-voltage current.

It is important to note that my earlier invention mentioned above refers, in its claims, to the concavities as bounded by "an approximately spherical zone surface." No such implied limitation is intended in this invention, and while the concavities are generally referred to as "substantially parabolic," the intent is broad enough including any concave, substantially continuous, internally curved surface.

The diameter of the opening of the concavities, at the surface of the sheet is preferably 1½" or more, because it has been found that optimum efficiency in reflecting infra-red waves is obtained only if the distance between the reflecting surface and the source of the waves is at least ¾".

FIGURE 3 is an enlarged cross-sectional view of a portion of one embodiment of the paneling herein disclosed.

FIGURE 4 is a cross-section of the embodiment of FIGURE 3 taken on line 4—4', showing the relative spacing of the concavities in surface 11.

FIGURES 5, 6, and 7 are cross-sectional views similar to that of FIGURE 3, showing other possible embodiments.

Figure 1:
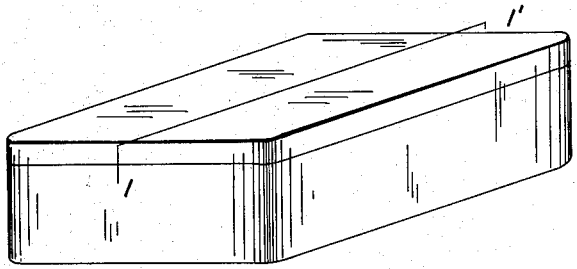
FIGURE 1 is a perspective view of a preferred embodiment of an entire heater in a closed position. The heater may conceivably be of any size.
Figure 2:
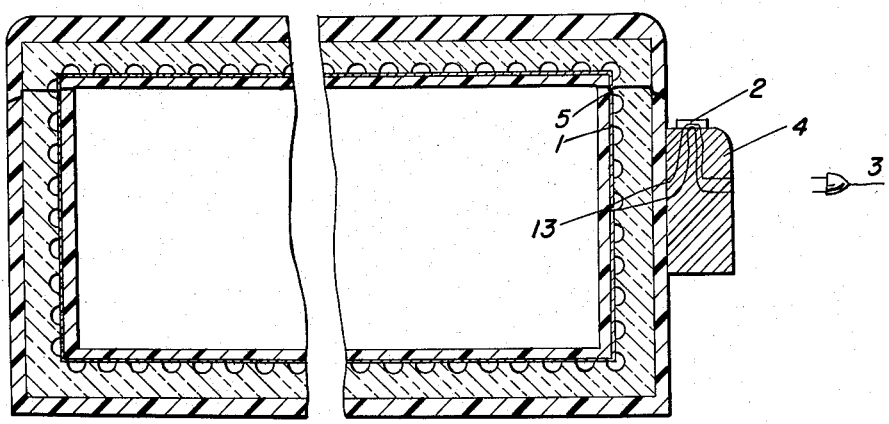
FIGURE 2 is a cross-sectional elevation of the heater of FIGURE 1, taken along 1—1' as shown in FIGURE 1.

The conductive layer 1 (FIGURE 2) completely encloses the food storage space, and may be connected to a source of current by plug 3 and receptacle 4. A rheostat 2 may be mounted on the receptacle box and used to control the current and therefore the temperature within the container. This rheostat may be thermostatically actuated, allowing the operator to select the desired temperature and set it directly with a dial mounted on the receptacle box. A connection 5 may be provided between the top and sides of the food heater by providing a small groove in the sides and a slight extension of the conducting layer from the top to form a tongue-and-groove joint. This also improves the insulating qualities of the container. A short circuit may be prevented by providing a break 13 between the upper and lower portions of the conducting layer, said break extending across the back and two side walls of the container.

As shown in FIGURE 3, the heating and insulating panel of the invention may comprise any common exterior or interior finishing surface 6, which is electrically non-conductive, such as glass, glass fiber reinforced polyester resin, etc.; a conductive layer 7 constructed of a medium to high electrical resistance material such as a conductive sheet or non-conductive sheet with zinc or cadmium vacuum deposited upon its surfaces, polyester film (sold by Du Pont as "Mylar") with a metal conductor vacuum deposited on one or both surfaces, or a laminate of Mylar or other plastic film or sheet or glass fiber reinforced plastic resin with wires or strips of an electrically conductive material molded or impregnated between layers, a sheet of relatively thick insulating material 9, such as foamed metal, foamed plastic, magnesia board, or a similar insulator, being provided with relatively small and approximately spherical or parabolic local concavities 10 throughout substantially its entire area 11; a coating of highly reflective electrically nonconductive material 8 covering the entire area of each concavity; backed by another of the insulating sheets described above and disposed in substantially the same manner; and another conventional finishing surface 12 such as aluminum, stainless steel, embossed plastic such as polyvinyl chloride, embossed leather or imitation leather, or any similar material or fabric. The conductive layer may be substantially thicker near the terminals in order to facilitate even current distribution throughout the layer.

This invention utilized all of the insulating properties described in my previous invention referred to earlier in this disclosure, such as the retardation of heat by the main fibrous sheet and the reflecting of heat waves by the concavities and the highly reflective coating applied thereto, to provide an effective and economical heating panel when used in conjunction with an electrically conductive layer disposed adjacent to the reflective surface as herein disclosed.

Another embodiment (FIGURE 5) may include the two surfacing sheets 6' and 12', conductor 7', and a single insulating sheet 9', containing depressions 10' and coated as described with a non-conductive material 8'.

Either of the surfacing layers may be omitted, as in the non-preferred embodiment shown in FIGURE 6, without materially reducing the utility of the invention. In FIGURE 6 is shown outer surfacing layer 12' and insulating sheet 9' containing depressions 10' coated with non-conductive material 8' with conductor 7' forming the inner face of the article.

Still another non-preferred embodiment (FIGURE 7) may have the entire surface of the insulating sheets coated with the highly reflective, electrically non-conductive material. In FIGURE 7 is shown two surfacing sheets 12' and 6', conductor 7', and a double insulating sheet 9', each of the insulating sheets 9' containing depressions 10', said insulating sheets 9' being coated completely on one face with non-conductive material 8'. It is important to provide that the materials immediately adjacent to the electrical conductor be non-conductors, to prevent the current from escaping into the insulating sheet (if it is a conductor) or into metal food containers stored within the food heater. Current values are not sufficiently high to produce danger to humans, but a wasteful loss of heat and energy might occur. For this reason the embodiment shown in FIGURE 6 would be preferred where no conductor could come in contact with the interior surface, as where glass food containers are stored.

The improved heating and insulating qualities of such a panel used in connection with food and beverage heaters are obvious. The conductor distributes the heat over the entire surface, thus eliminating "hot-spots". The concave depressions coated with reflective, electrically non-conductive material augment the insulating properties of the thick sheet by reflecting and focusing heat rays toward the interior of the food container. There can be any number of these concavities, stamped, cut, or otherwise formed in the surface of the insulating sheets, and by properly orientating said concavities the structural properties and insulating properties of the panel may be materially increased. The interior temperature of the food heater is easily controlled by the amount of current allowed to flow through the conductor-plate, and the current may be thermostatically regulated from outside the food-heater.

To provide a rough approximation of the actual dimensions and quantity of electricity required, a food heater such as might be employed in a private plane or boat may have exterior dimensions of 20" x 20" x 14". The paneling illustrated in FIGURE 3 is utilized, and the dimensions are as follows: Interior surfacing of glass fiber reinforced polyester resin 1/16" thick; heating plate of stainless steel .0001" thick; two insulating panels of foamed polystyrene 1/2" thick; coated with white epoxy-base resin .006" thick; exterior layer of glass fiber reinforced polyester resin 3/32" thick; total thickness of panel 1 1/4", total capacity of 3520 cubic inches or about 2 cubic feet.

The current needed to maintain an interior temperature of 180° F. in an atmosphere at 40° F. is about 13 amps. supplied at a potential of about 5.2 volts.

The panel of the invention is also suitable for providing a heating and heat-retaining panel that will allow the economical and even heating of any enclosed spaces or surfaces, such as rooms or walls of buildings.

While certain modifications and embodiments of the invention have been described, it is of course to be understood that there are a great number of variations which will suggest themselves to anyone familiar with the subject matter thereof and it is to be distinctly understood that this invention should not be limited except by such limitations as are clearly imposed in the appended claims.

I claim:

1. A food heater as herein described, having side walls, a top, and a bottom; each of said side walls, said top and said bottom comprising a panel; said panel comprising; a sheet of insulating material having a plurality of local concavities throughout a major portion of a side thereof each bounded by a substantially continuous internally curved surface, a continuous coating of highly reflective electrically non-conductive material completely covering the said surface of each concavity and a sheet of electrically conductive material next adjacent to said side of said sheet of insulating material.

2. A food heater as herein described, having side walls, a top, and a bottom; each of said side walls, said top, and said bottom comprising a panel; said panel comprising: a sheet of insulating material having a plurality of local concavities throughout a major portion of a side thereof each bounded by a substantially continuous internally curved surface, a continuous coating of highly reflective electrically non-conductive material completely covering the said surface of each concavity, a sheet of electrically conductive material next adjacent to said side of said sheet of insulating material, and a means for causing electric current to flow through said sheet.

3. The device of claim 1, wherein said coating of highly reflective electrically non-conductive material extends continuously over said side of said sheet of insulating material which is adjacent to said sheet of electrically conductive material.

4. A food heater as herein described, having side walls, a top, and a bottom; each of said side walls, said top, and said bottom comprising a panel; said panel comprising; sheets of insulating material each having a plurality of local concavities throughout a major portion of a side thereof, each of said local concavities bounded by a substantially continuous internally curved surface, a continuous coating of highly reflective, electrically non-conductive material completely covering each of said surfaces, said sheets disposed adjacent to one another so as to have said sides containing said concavities all facing in substantially the same direction with the axes of the concavities of said sheets of insulating material being mutually displaced, and a sheet of electrically conductive material next adjacent to said side that remains uncovered by any of said sheets of insulating material.

5. A food heater as herein described, having side walls, a top, and a bottom; each of said side walls, said top, and said bottom comprising a panel; said panel comprising: a sheet of insulating material having a plurality of local concavities throughout a major portion of a side thereof each bounded by a substantially continuous internally curved surface, a continuous coating of highly reflective, electrically non-conductive material completely covering the said surface, a sheet of electrically conductive material next adjacent to said side of said sheet of insulating material, and a layer of decorative material adjacent to said electrically conductive material.

References Cited in the file of this patent

UNITED STATES PATENTS

| | | |
|---|---|---|
| 2,173,815 | Slisz et al. | Sept. 19, 1939 |
| 2,505,117 | Hoffmann | Apr. 25, 1950 |
| 2,634,361 | Reynolds | Apr. 17, 1953 |
| 2,747,651 | Lighter | May 29, 1956 |
| 2,799,764 | Chandler | July 16, 1957 |